(12) United States Patent
Yoo

(10) Patent No.: US 12,573,642 B2
(45) Date of Patent: Mar. 10, 2026

(54) SEPARATOR FOR FUEL CELL AND SEPARATOR ASSEMBLY AND FUEL CELL STACK INCLUDING THE SAME

(71) Applicants: Hyundai Motor Company, Seoul (KR); Kia Corporation, Seoul (KR)

(72) Inventor: Jin Hyeok Yoo, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 627 days.

(21) Appl. No.: 17/969,249

(22) Filed: Oct. 19, 2022

(65) Prior Publication Data

US 2023/0361319 A1    Nov. 9, 2023

(30) Foreign Application Priority Data

May 4, 2022    (KR) ........................ 10-2022-0055310

(51) Int. Cl.
| | |
|---|---|
| *H01M 8/0263* | (2016.01) |
| *H01M 8/0206* | (2016.01) |
| *H01M 8/0267* | (2016.01) |
| *H01M 8/0273* | (2016.01) |

(52) U.S. Cl.
CPC ....... *H01M 8/0263* (2013.01); *H01M 8/0206* (2013.01); *H01M 8/0267* (2013.01); *H01M 8/0273* (2013.01)

(58) Field of Classification Search
CPC .. H01M 8/242; H01M 8/1004; H01M 8/0286; H01M 8/0273; H01M 4/8807
See application file for complete search history.

(56) References Cited

U.S. PATENT DOCUMENTS

| | | | |
|---|---|---|---|
| 7,883,814 B2 | 2/2011 | Watanabe et al. | |
| 8,097,379 B2 | 1/2012 | Suenaga et al. | |
| 2011/0229790 A1* | 9/2011 | Sato .................... | H01M 8/0278 429/469 |
| 2013/0157165 A1* | 6/2013 | Takeguchi .......... | H01M 8/0267 429/480 |

FOREIGN PATENT DOCUMENTS

KR    20180096395 A    8/2018

* cited by examiner

*Primary Examiner* — Olatunji A Godo
(74) *Attorney, Agent, or Firm* — Slater Matsil, LLP

(57) ABSTRACT

An embodiment separator for a fuel cell includes a separator body having a plate shape and including a metal material on which a plurality of manifolds is provided to introduce or discharge reaction gas or cooling water and a molding gasket surrounding an inner edge of at least one manifold selected from among the plurality of manifolds provided on the separator body, the molding gasket being configured to prevent corrosion.

18 Claims, 10 Drawing Sheets

- PRIOR ART -

SEPARATOR FOR FUEL CELL AND SEPARATOR ASSEMBLY AND FUEL CELL STACK INCLUDING THE SAME

CROSS-REFERENCE TO RELATED APPLICATIONS

This application claims the benefit of Korean Patent Application No. 10-2022-0055310, filed on May 4, 2022, which application is hereby incorporated herein by reference.

TECHNICAL FIELD

The present invention relates to a separator for a fuel cell and a separator assembly and a fuel cell stack including the same.

BACKGROUND

A fuel cell is a type of power generation device that converts chemical energy of fuel into electrical energy through electrochemical reaction of the chemical energy in a stack. The fuel cell can be used not only to supply driving power for industrial products, household products and vehicles, but also to power small electronic products such as portable devices. In recent years, the use area is gradually expanding as a high-efficiency clean energy source.

FIG. 1 is a view showing the configuration of a general fuel cell stack.

As can be seen from FIG. 1, a membrane electrode assembly (MEA) 10 is located at the innermost side of a unit cell constituting a general fuel cell stack, and the membrane electrode assembly 10 is configured with a polymer electrolyte membrane 11 for moving hydrogen cations (protons) and a catalyst layer coated on both sides of the polymer electrolyte membrane so that hydrogen and oxygen can react, that is, an anode 12 and a cathode 13.

In addition, a pair of gas diffusion layers (GDLs) 20 is stacked on the outer part of the membrane electrode assembly 10, that is, on the outer part where the anode 12 and the cathode 13 are located, and a separator assembly 30 having a flow field for supplying fuel and discharging water generated by the reaction is located on the outside of the gas diffusion layers 20 with a gasket 40 interposed therebetween.

In this case, the separator assembly 30 is formed by bonding an anode separator 31 disposed on the anode and a cathode separator 32 disposed on the cathode while facing each other.

Meanwhile, the fuel cell stack is formed by stacking a plurality of unit cells, and an end plate 50 for supporting and fixing each of the above-described components is coupled to the outermost of the stacked unit cells.

In this case, the anode separator 31 disposed in any one unit cell is stacked so as to face the cathode separator 32 of another unit cell disposed adjacent to the unit cell.

Accordingly, in order to smoothly perform the stacking process of the unit cells and maintain the alignment of each unit cell, the separator assembly 30 in which the cathode separator 32 and the anode separator 31 of adjacent unit cells disposed to face each other are integrated is used to construct the unit cell.

In this case, the anode separator 31 and the cathode separator 32 constituting the separator assembly 30 are bonded and integrated, so that manifolds communicate with each other, and the reaction surfaces are configured in a similar shape to be disposed at the same position.

On the other hand, the anode separator 31 and the cathode separator 32 constituting the separator assembly 30 have been manufactured with a thin metal material for productivity, light weight, miniaturization of the stack, and the like, unlike the conventional one in which graphite materials were used.

However, the anode separator 31 and the cathode separator 32 made of a metal material are exposed to the risk of corrosion due to the acidic atmosphere and moisture inside the fuel cell stack.

In particular, corrosion is easy to occur on the side of the manifold where reaction gas, cooling water and generated water are introduced or discharged. Unlike other components that have been surface-treated to prevent corrosion, the manifold formed through the cutting process in the anode separator 31 and the cathode separator 32 is very susceptible to corrosion as the base material of the separator is exposed to the outside as it is at the cross section cut in the cutting process, that is, at the inner edge of the manifold.

The content described as the background above is only for understanding the background of embodiments of the present invention, and should not be taken as an acknowledgment that it corresponds to the prior art already known to those of ordinary skill in the art.

SUMMARY

The present invention relates to a separator for a fuel cell and a separator assembly and a fuel cell stack including the same. Particular embodiments relate to a separator for a fuel cell and a separator assembly and a fuel cell stack including the same capable of preventing corrosion of an inner edge of a manifold when exposed to moisture.

Embodiments of the present invention provide a separator for a fuel cell capable of preventing corrosion of an inner edge of a manifold when exposed to moisture and a separator assembly and a fuel cell stack including the same.

In addition, embodiments of the present invention provide a separator for a fuel cell capable of preventing narrowing or blocking of a path through which reaction gas and cooling water are introduced or discharged in the process of surrounding an inner edge of a manifold using a gasket, and a separator assembly and a fuel cell stack including the same.

The technical features obtainable by embodiments of the present invention are not limited to the technical features mentioned above, and other technical features not mentioned will be clearly understood by those of ordinary skill in the art from the description of embodiments of the present invention.

A separator for a fuel cell according to an embodiment of the present invention includes a separator body in a plate shape and formed of a metal material on which a plurality of manifolds is formed to introduce or discharge reaction gas or cooling water and a molding gasket surrounding an inner edge of at least one manifold selected from among the plurality of manifolds formed on the separator body to prevent corrosion.

The molding gasket integrally surrounds upper, side and bottom surfaces of the inner edge of the selected manifold.

A reaction region in which a flow field through which the reaction gas or the cooling water flows is formed in a central region of the separator body, and the plurality of manifolds is formed in both sides of the reaction region, a sealing gasket line surrounding the reaction region and each manifold is formed on a surface of the separator body, and a height at which the molding gasket protrudes from a surface of the separator body is lower than a height of the sealing gasket line.

A plurality of flow field holes is formed between at least one manifold selected from among the plurality of manifolds formed in the separator body and the reaction region, spaced apart at a predetermined interval to flow the reaction gas or the cooling water, and a support gasket extending from the sealing gasket line in a direction of the selected manifold is formed between the plurality of flow field holes, the molding gasket being connected to the support gasket.

A height at which the molding gasket protrudes from the surface of the separator body is lower than a height of the support gasket.

A corner of the molding gasket is formed with an inclined surface or a round surface.

The molding gasket surrounds all the inner edges of the selected manifold to form a closed loop.

Further, a separator assembly for a fuel cell according to an embodiment of the present invention is a separator assembly for a fuel cell including a pair of separators. The separator assembly includes a first separator formed in a plate shape, the first separator including a plurality of first manifolds through which reaction gas or cooling water is introduced or discharged, and a first molding gasket surrounding an inner edge of at least one first manifold selected from among the plurality of first manifolds to prevent corrosion, and a second separator formed in a plate shape and bonded to the first separator, the second separator including a plurality of second manifolds in communication with the plurality of first manifolds through which the reaction gas or the cooling water is introduced or discharged, and a second molding gasket surrounding the inner edge of at least one second manifold selected from among the plurality of second manifolds.

Among the first manifolds formed on the first separator and the second manifolds formed on the second separator, the first manifold and the second manifold communicating with each other have different sizes.

A first reaction region in which a flow field through which the reaction gas or the cooling water flows is formed in a central region of the first separator, the plurality of first manifolds is formed in both sides of the first reaction region, the second separator has a second reaction region formed at a position corresponding to a position where the first reaction region is formed, and the inner edge of the first manifold facing the first reaction region and the inner edge of the second manifold facing the second reaction region are formed on different lines.

A height at which the first molding gasket protrudes from a surface of the first separator and a height at which the second molding gasket protrudes from a surface of the second separator is lower than a distance between the first separator and the second separator.

The height at which the first molding gasket protrudes from the surface of the first separator is different from the height at which the second molding gasket protrudes from the surface of the second separator.

Corners of the first molding gasket and the second molding gasket are formed with an inclined surface or a round surface.

Still further, a fuel cell stack is configured by stacking a plurality of unit cells, each unit cell including a membrane electrode assembly, a pair of gas diffusion layers, a first separator and a second separator. The first separator and the second separator facing each other in adjacent unit cells are bonded to each other and integrated, the first separator is formed in a plate shape and includes a plurality of first manifolds through which reaction gas or cooling water is introduced or discharged and a first molding gasket surrounding an inner edge of at least one first manifold selected from among the plurality of first manifolds to prevent corrosion, the second separator is formed in a plate shape and bonded to the first separator and includes a plurality of second manifolds in communication with the plurality of first manifolds through which the reaction gas or the cooling water is introduced or discharged and a second molding gasket surrounding the inner edge of at least one second manifold selected from among the plurality of second manifolds to prevent corrosion.

Among the first manifolds formed on the first separator and the second manifolds formed on the second separator, the first manifold and the second manifold communicating with each other have different sizes, and the inner edge of the first manifold and the inner edge of the second manifold formed on a path through which at least the reaction gas or the cooling water is introduced or discharged are formed on different lines from each other.

According to an embodiment of the present invention, the inner edge of the manifold where the base material of metal is exposed as it is due to the formation of the manifold in the manufacturing process of the separator is protected by surrounding the inner edge of the manifold with a molding gasket of a rubber material. The effect of preventing corrosion can be expected by preventing the base material of metal in the inner edge of the manifold from being directly exposed to moisture such as cooling water or generated water.

In addition, the size of the first manifold of the first separator and the size of the second manifold of the second separator constituting the separator assembly are formed differently, so that it can be expected that the cross-sectional area of the path through which the reaction gas, the cooling water and the generated water flow can be prevented from being significantly narrowed or blocked even when the inner edge of each manifold is surrounded by the molding gasket.

In addition, the molding gasket surrounding the inner edge of the manifold and the support gasket already formed on the separator to form a sealing line are connected, so that additional rigidity of the inner edge of the manifold is secured to prevent deformation such as bending of the separator. Accordingly, it is possible to prevent narrowing of the cross-sectional area of the path through which the reaction gas, the cooling water, and the generated water flow.

Figure 1:
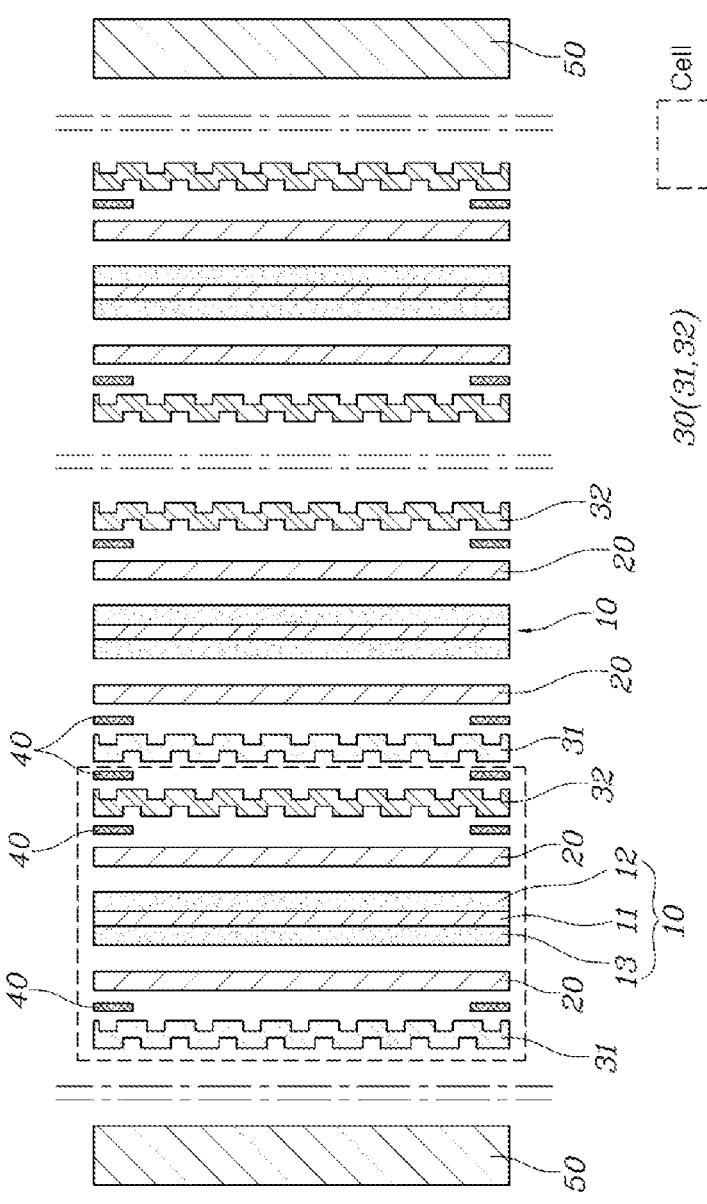
FIG. 1 is a view showing the configuration of a general fuel cell stack.

The following reference identifiers may be used in connection with the accompanying drawings to describe exemplary embodiments of the present disclosure.

10: membrane electrode assembly (MEA)
20: gas diffusion layer (GDL)
30: separator assembly
31: anode separator
32: cathode separator
32*a* to 32*g*: manifold
40: gasket
50: end plate
100: first separator
100*a*: first reaction surface
100*b*: first cooling surface
110: first separator body
110*a*, 110*b*: first reaction region
111: first manifold
112: first flow field hole
113: first sealing gasket line
114: first support gasket
120: first molding gasket
200: second separator
200*a*: second reaction surface
200*b*: second cooling surface
210: second separator body
210*a*, 210*b*: second reaction region
211: second manifold
212: second flow field hole
213: second sealing gasket line
214: second support gasket
220: second molding gasket

DETAILED DESCRIPTION OF ILLUSTRATIVE EMBODIMENTS

Hereinafter, embodiments of the present invention will be described in more detail with reference to the accompanying drawings. However, the present invention is not limited to the embodiments disclosed below, but will be implemented in a variety of different forms, and these embodiments are provided only so that the disclosure of the present invention is complete and to fully inform those of ordinary skill in the scope of the invention. In the drawings, like reference numerals refer to like elements.

The fuel cell stack according to an embodiment of the present invention maintains the general configuration of the fuel cell stack shown in FIG. 1 as it is, and the inner edge of the manifold formed on the separator is surrounded with a molding gasket of a rubber material to prevent corrosion.

In other words, a predetermined region of the separator is cut to form the manifold. Accordingly, the base material of metal is unavoidably exposed at the inner edge of the manifold, and this exposed inner edge of the manifold is surrounded with a molding gasket of a rubber material so that it is not directly exposed to moisture such as cooling water or generated water, thereby preventing corrosion.

Accordingly, as shown in FIG. 1, in a fuel cell stack according to an embodiment of the present invention, a unit cell is configured to include the membrane electrode assembly 10, the pair of gas diffusion layers 20, the anode separator 31, and the cathode separator 32, and a plurality of the unit cells is connected in series. Therefore, the anode separator 31 included in one unit cell is disposed to face the cathode separator 32 included in another unit cell adjacent thereto. In this embodiment, the separator assembly 30 is formed by bonding the anode separator 31 and the cathode separator 32 facing each other.

On the other hand, in this embodiment, the molding gasket applied to the separator is applied to both the anode separator and the cathode separator, so that the anode separator and the cathode separator are not described separately. The cathode separator is referred to as a first separator, and the anode separator is referred to as a second separator. Also, it is apparent that the first separator is not limited to the cathode separator but may be the anode separator, and the second separator is not limited to the anode separator but may be the cathode separator.

First, a separator for a fuel cell and a separator assembly according to an embodiment of the present invention will be described in detail. The separator described herein is applied to a first separator and a second separator constituting a separator assembly to be described later. Therefore, the separator for a fuel cell according to an embodiment of the present invention may be a cathode separator or an anode separator.

In addition, the separator assembly for a fuel cell according to an embodiment of the present invention is configured by bonding the first separator and the second separator to each other. Here, the first separator corresponds to the cathode separator, and the second separator corresponds to the anode separator. Also, it is apparent that this embodiment is not limited to the first separator corresponding to the cathode separator and the second separator corresponding to the anode separator, but the first separator may correspond to the anode separator, and the second separator may correspond to the cathode separator.

Figure 2:
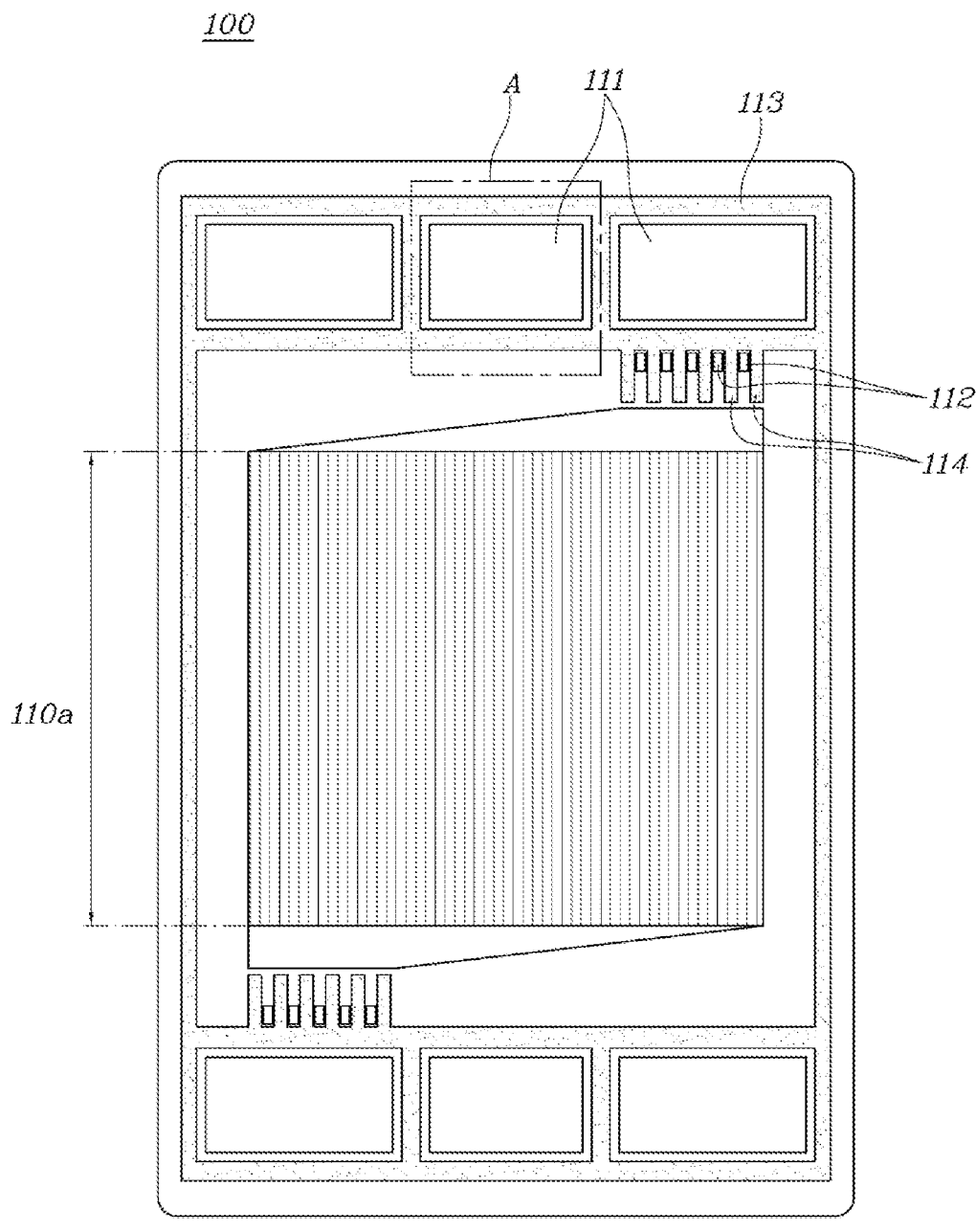
FIG. 2 is a view showing a separator for a fuel cell according to an embodiment of the present invention.
Figure 3A:
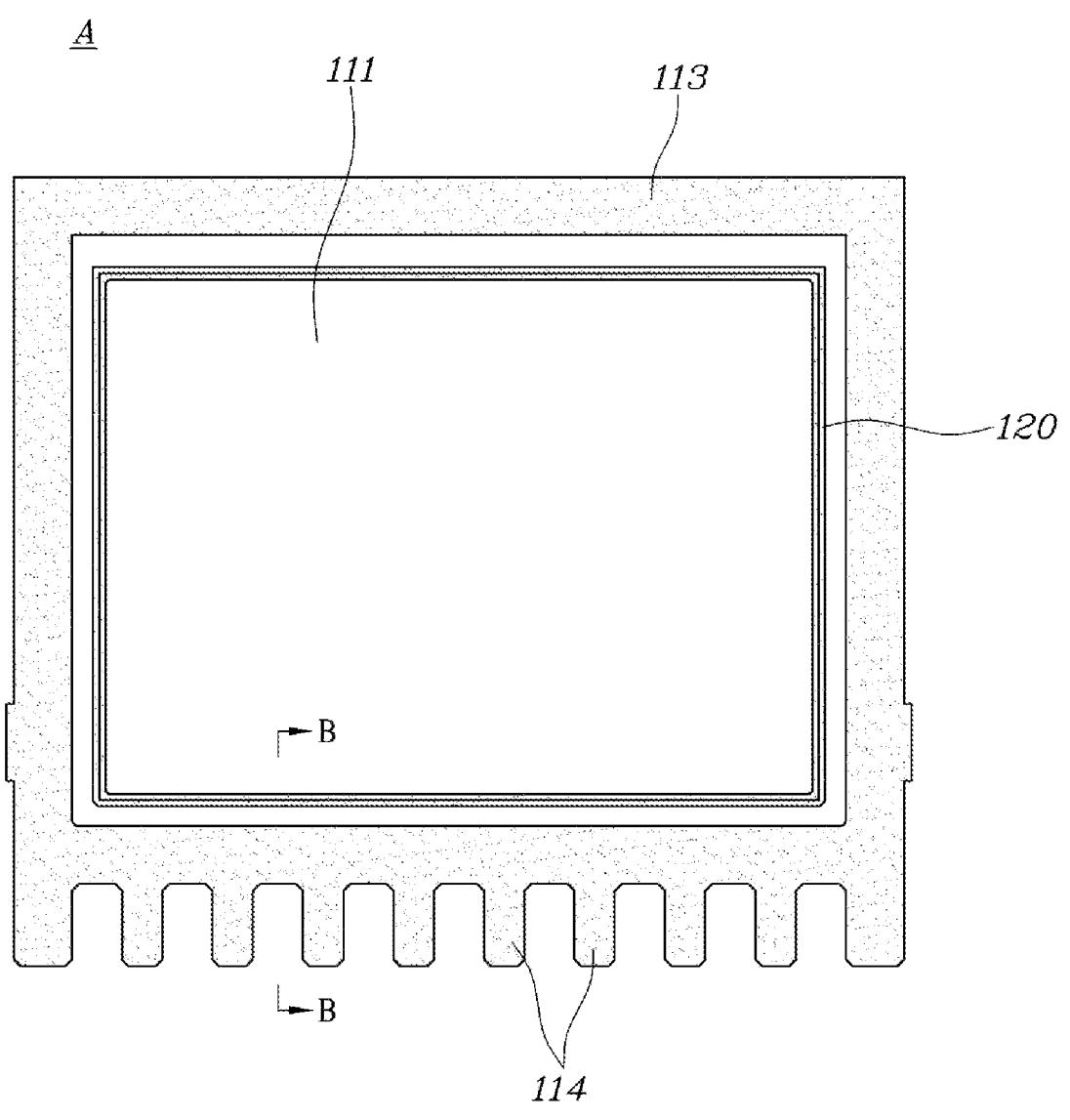
FIG. 3A is an enlarged view of the part "A" of FIG. 2.
Figure 3B:
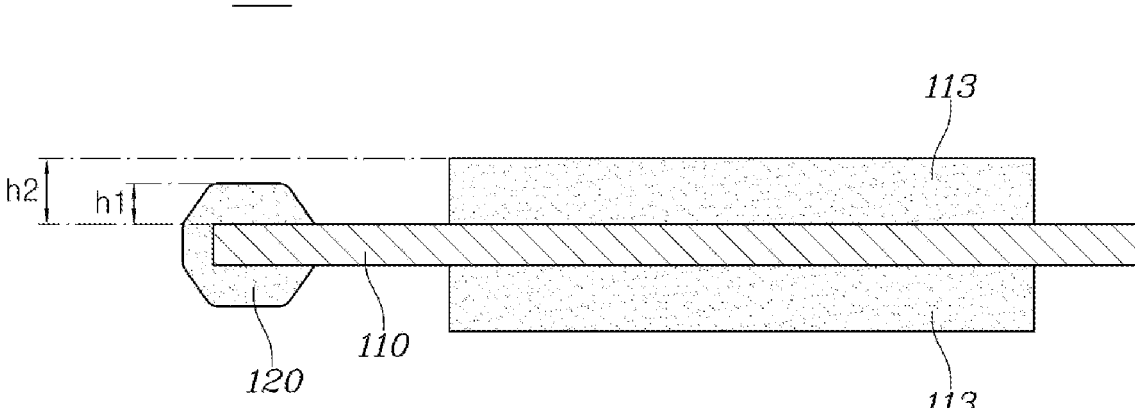
FIG. 3B is a cross-sectional view taken along the line B-B of the part "A" of FIG. 3A.
Figure 4A:
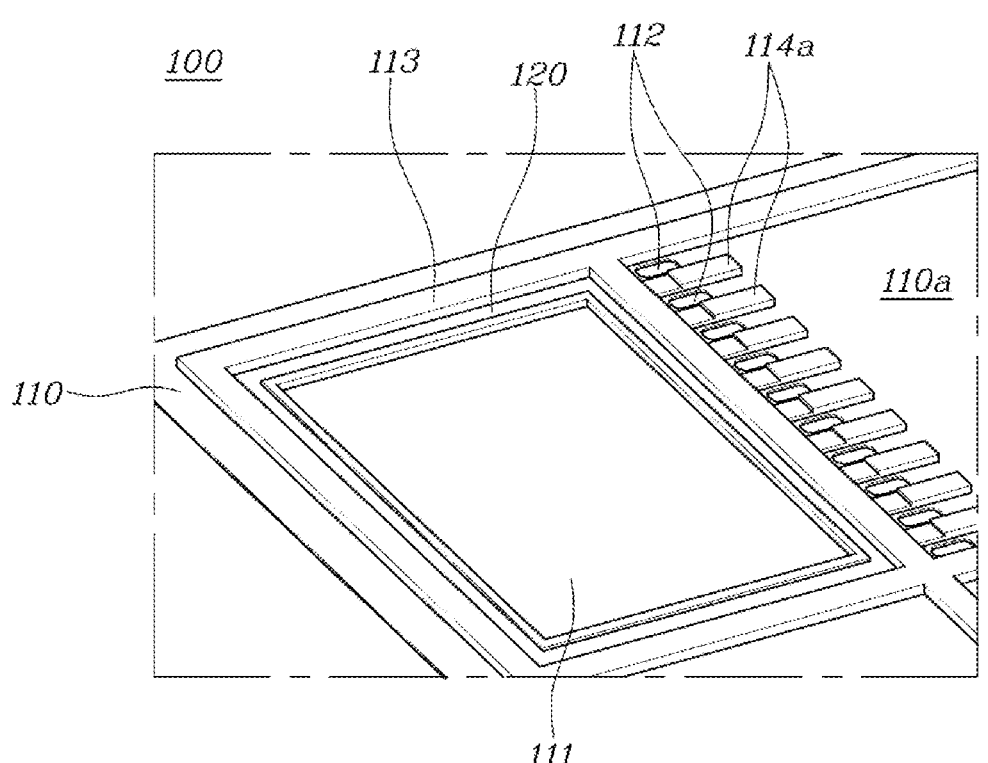
FIG. 4A is a view showing the main part of a reaction surface of a first separator according to an embodiment of the present invention.
Figure 4B:
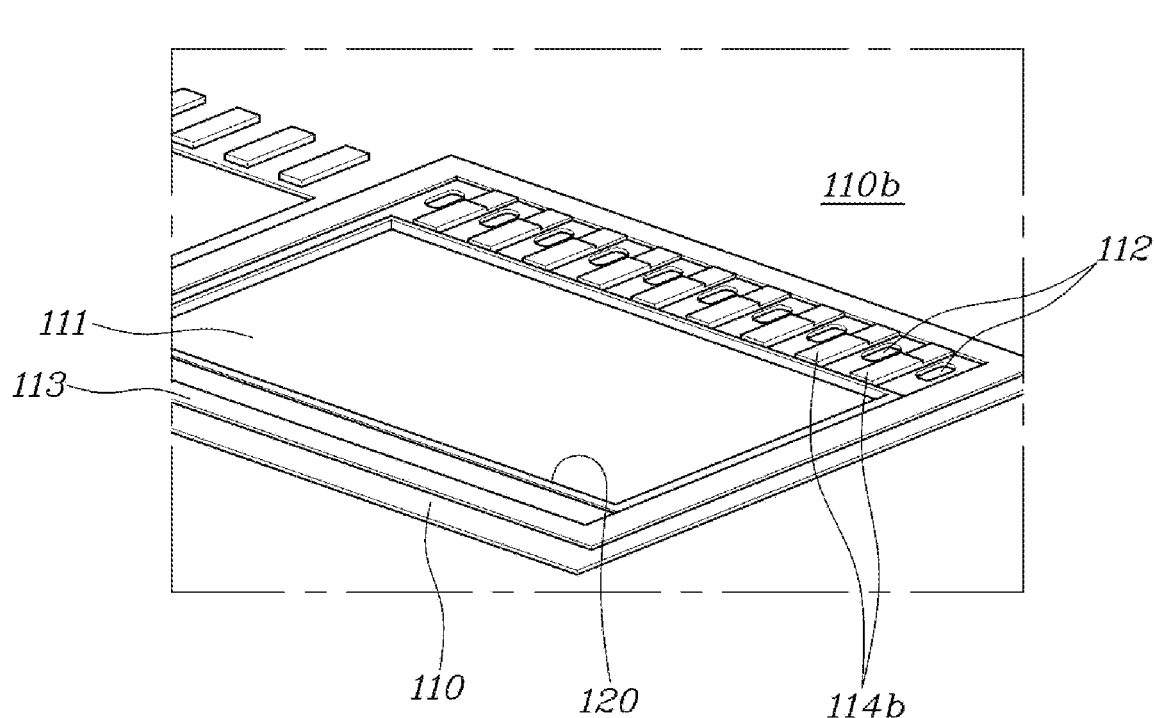
FIG. 4B is a view showing the main part of a cooling surface of a first separator according to an embodiment of the present invention.
Figure 5A:
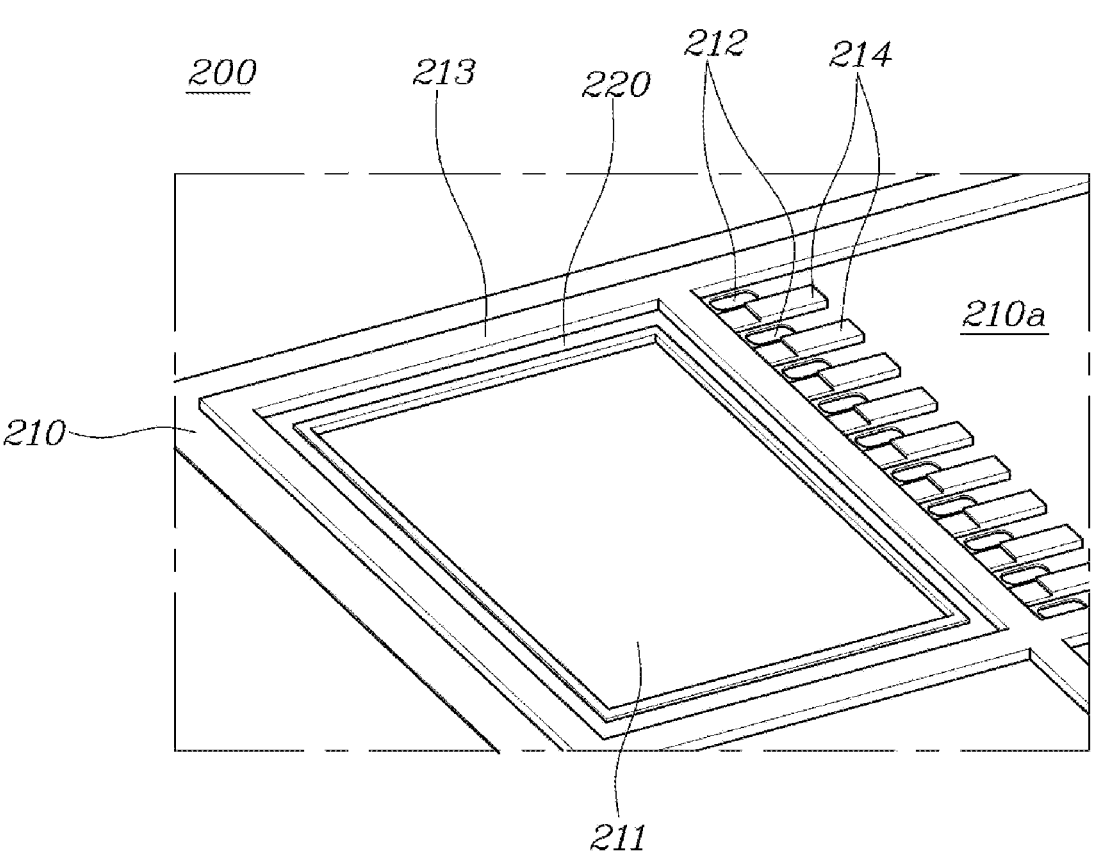
FIG. 5A is a view showing the main part of a reaction surface of a second separator according to an embodiment of the present invention.
Figure 5B:
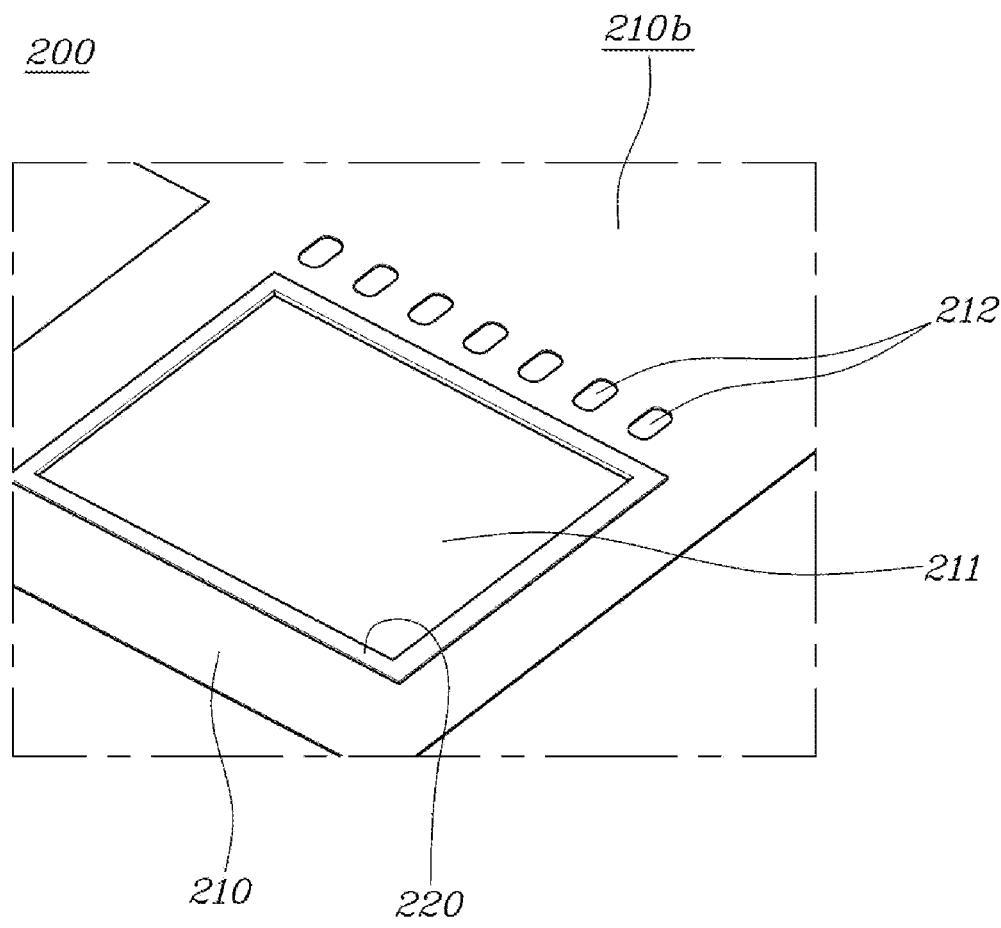
FIG. 5B is a view showing the main part of a cooling surface of a second separator according to an embodiment of the present invention.
Figure 6:
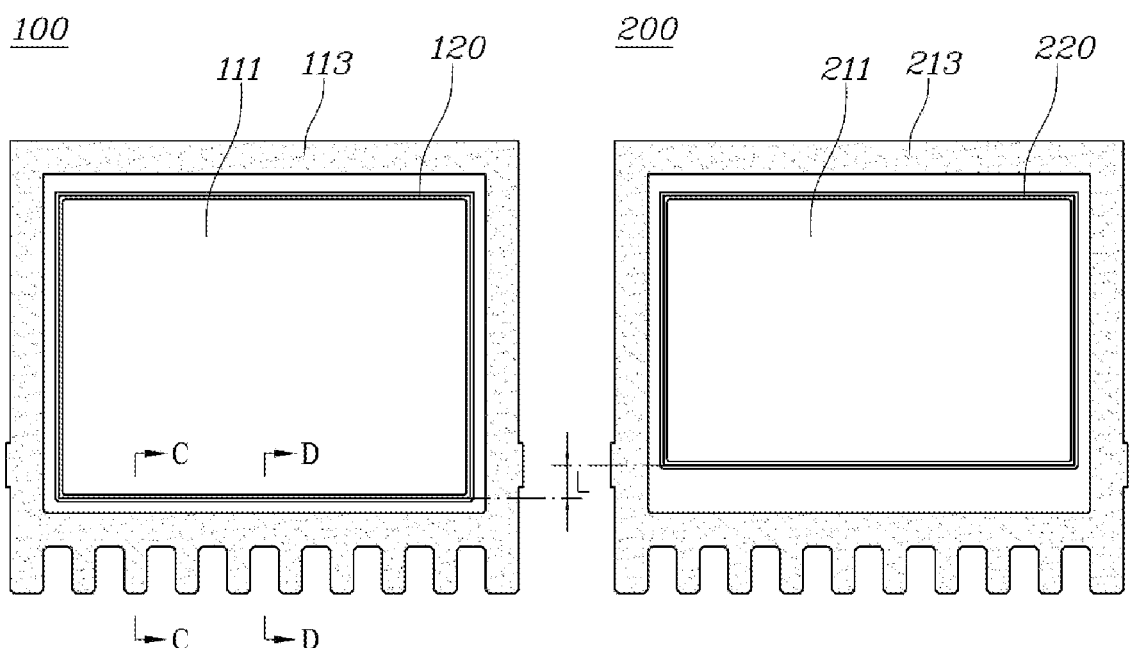
FIG. 6 is a view comparing the main parts of a first separator and a second separator according to an embodiment of the present invention.
Figure 7A:
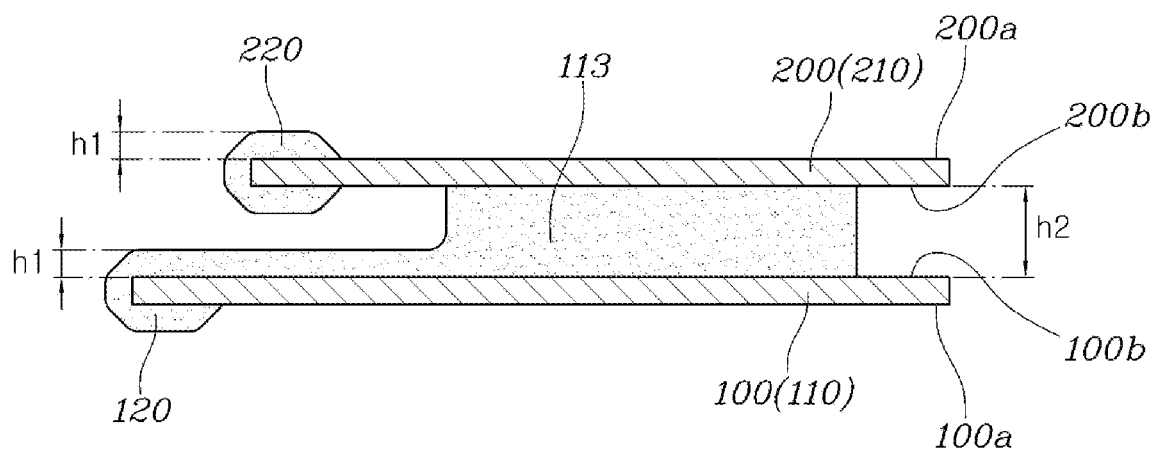
FIGS. 7A and 7B are cross-sectional views of the main part of a separator assembly according to an embodiment of the present invention.
Figure 7B:
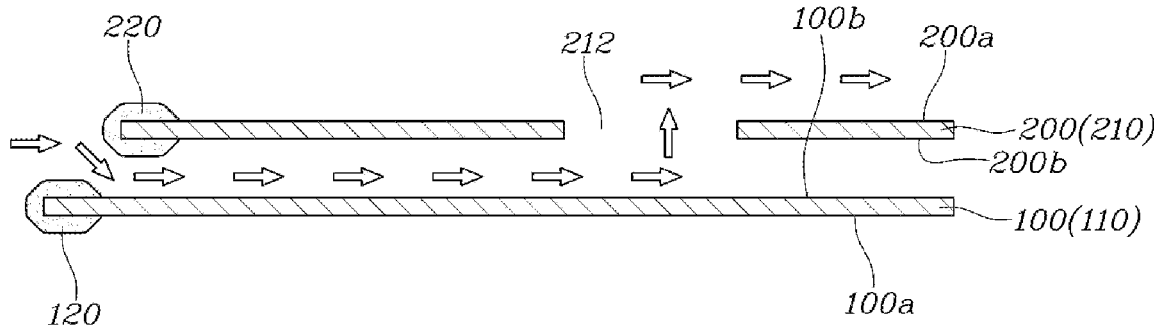

FIG. 2 is a view showing a separator for a fuel cell according to an embodiment of the present invention, FIG. 3A is an enlarged view of the part "A" of FIG. 2, FIG. 3B is a cross-sectional view taken along the line B-B of the part "A" of FIG. 3A, FIG. 4A is a view showing the main part of a reaction surface of a first separator according to an embodiment of the present invention, FIG. 4B is a view showing the main part of a cooling surface of a first separator according to an embodiment of the present invention, FIG. 5A is a view showing the main part of a reaction surface of a second separator according to an embodiment of the present invention, FIG. 5B is a view showing the main part of a cooling surface of a second separator according to an embodiment of the present invention, FIG. 6 is a view comparing the main parts of a first separator and a second separator according to an embodiment of the present invention, and FIGS. 7A and 7B are cross-sectional views of the main parts of a separator assembly according to an embodiment of the present invention. In this case, FIG. 7A is a cross-sectional view taken along the line C-C of FIG. 6, and FIG. 7B is a cross-sectional view taken along the line D-D of FIG. 6.

Here, the first separator 100 is employed as the cathode separator, and the second separator 200 is employed as the anode separator. (See FIGS. 7A and 7B.)

In particular, since the separator described in embodiments of the present invention is a technology applicable to both the cathode separator and the anode separator, the separator for a fuel cell according to an embodiment of the present invention will be described using the first separator as an example.

The separator for a fuel cell according to an embodiment of the present invention, that is, the first separator 100, includes a first separator body 110 in which a plurality of first manifolds 111 is formed and a first molding gasket 120 surrounding an inner edge of at least one first manifold 111 selected from among the plurality of first manifolds 111 formed on the first separator body 110.

The first separator body 110 is formed in a plate shape of a metal material. First reaction regions 110a, 110b in which a flow field through which reaction gas or cooling water flows are formed in the central region of the first separator body 110, and the plurality of first manifolds 111 through which reaction gas or cooling water is introduced or discharged is formed in both sides of the first reaction regions 110a, 110b.

For example, six first manifolds 111 formed on the first separator body 110 are provided so that hydrogen, air, and cooling water can each be introduced or discharged, and preferably, three manifolds are provided on both sides of the first reaction regions 110a, 110b, respectively.

In this case, one surface of the first separator body 110 is a first reaction surface 100a through which reaction gas flows, and the other surface of the first separator body is a first cooling surface 100b through which cooling water flows (see FIG. 7A).

Meanwhile, a first sealing gasket line 113 surrounding the first reaction regions 110a, 110b and each first manifold 111 is formed on the surface of the first separator body 110. The first sealing gasket line 113 is formed by injecting a gasket of a rubber material.

In addition, a plurality of first flow field holes 112 through which reaction gas or cooling water flows is formed spaced apart at a predetermined interval between the first manifold 111 through which reaction gas or cooling water is introduced or discharged, among the plurality of first manifolds 111 formed in the first separator body 110, and the first reaction regions 110a, 110b. For example, in the case of the cathode separator, a plurality of first flow field holes 112 through which air flows is formed between the first manifold 111 through which air is introduced and the first reaction regions 110a, 110b, and between the first reaction regions 110a, 110b and the first manifold 111 through which air is discharged.

In addition, a first support gasket 114b selected from the first sealing gasket line 113 extending in the direction of the first manifold 111 is formed between the plurality of first flow field holes 112. For example, as shown in FIG. 4B, in the case of the first cooling surface 100b of the cathode separator, the first support gasket 114b is formed from the first sealing gasket line 113 to extend in the direction of the first manifold 111 through which air is introduced or discharged.

Also, as shown in FIG. 2, 4A or 5A, the first and second support gaskets 114a, 114b, 214 may be formed to extend from the first and second sealing gasket lines 113, 213 in the direction of the first and second reaction regions 110a, 110b, 210a. In addition, the sealing gasket line and the support gasket may not be formed as shown in FIG. 5B.

It is preferable that the formation of the sealing gasket line, the position where the support gasket is formed, and the arrangement relationship between the sealing gasket line and the support gasket are determined according to whether or not reaction gas or cooling water flows through the flow field hole and the flow direction.

On the other hand, the first molding gasket 120 is a means for molding the inner edge of the first manifold 111 to prevent the base material of metal from being directly exposed at the inner edge of the first manifold 111 formed on the first separator body 110, and is formed using a rubber material such as EPDM and FKM. Also, it is preferable to form the first molding gasket 120 in one injection process using the same material as the material forming the first sealing gasket line 113 and the first support gasket 114.

It is preferable that the first molding gasket 120 is selectively applied to the first manifold 111 of which corrosion is a concern among the first manifolds 111 formed on the first separator body 110. However, since reaction gas or cooling water flows through the first manifold 111, the reaction gas may contain moisture, and the water generated in the first reaction region 110a flows to be discharged to the outside, and thus, it is better to apply the first molding gasket 120 to all the first manifolds 111 formed on the first separator body 110.

On the other hand, the first molding gasket 120 is formed to integrally surround the upper, side and bottom surfaces forming the inner edge of the first manifold 111 in order to surround the inner edge of the first manifold 111. Therefore, as shown in FIG. 3B, the cross-section of the first molding gasket 120 is formed in a substantially "L" shape.

In addition, it is preferable that the first molding gasket 120 surrounds all the inner edges of the first manifold 111 to form a closed loop. Therefore, all the inner edges of the first manifold 111 are molded to prevent corrosion from occurring in all the inner edges of the first manifold 111.

In this case, by forming the corner of the first molding gasket 120 in an inclined surface or a round surface, the interference with the flow of reaction gas or cooling water to the region where the first molding gasket 120 is formed is prevented as much as possible. In addition, when the corner of the first molding gasket 120 is formed at a right angle, a vortex of the reaction gas or cooling water may be generated in the corresponding region, so that the corner of the first molding gasket 120 is formed in an inclined or round surface. Accordingly, it can also be expected to prevent the occurrence of a vortex phenomenon in the flow of the reaction gas or cooling water in the corresponding region.

In addition, in order to prevent narrowing or blocking of the path through which reaction gas or cooling water flows, the height (h1) of the first molding gasket 120 protruding from the surface of the first separator body 110 should be lower than the height (h2) of the first sealing gasket line 113. If the height (h1) at which the first molding gasket 120 protrudes from the surface of the first separator body 110 is equal to the height (h2) of the first sealing gasket line 113, a path through which reaction gas or coolant flows is not secured. The height (h1) at which the first molding gasket 120 protrudes from the surface of the first separator body 110 is higher than the height (h2) of the first sealing gasket line 113, there is a problem that the sealing effect of the first sealing gasket line 113 disappears.

On the other hand, when the first support gasket 114b is disposed around the first molding gasket 120, it is preferable to connect the first molding gasket 120 and the first support gasket 114b.

For example, as shown in FIG. 4B, air is introduced from the first cooling surface 100b of the first separator 100, so that the first flow field hole 112 flowing to the first reaction region 110b of the first separator 100 is formed. In this case, in order to secure a flow path of air, which is reaction gas, the first sealing gasket line 113 is formed in a shape surrounding the outer region of the first manifold 111 through which air is introduced and the first flow field hole 112. The first support gasket 114*b* extending from the first sealing gasket line 113 in the direction of the first manifold 111 is formed between the first flow field holes 112.

In this case, the first molding gasket 120 is preferably formed to be connected to the first support gasket 114*b* in order to reinforce the rigidity of the inner edge of the first manifold 111.

However, in order to secure a path through which the air introduced into the first manifold 111 flows to the first flow field hole 112, the height at which the first molding gasket 120 protrudes from the surface of the first separator body 110 should be formed lower than the height of the first support gasket 114*b*.

On the other hand, the separator assembly for a fuel cell according to an embodiment of the present invention employs the configuration of the separator described above, and is formed by bonding a pair of separators, that is, the first separator 100 and the second separator 200.

The molding gaskets 120, 220 are formed on both the first separator 100 and the second separator 200.

For example, the first separator 100 is formed in a plate shape to form the plurality of first manifolds 111 through which reaction gas or cooling water is introduced or discharged, and the first molding gasket 120 is formed to surround the inner edge of at least one first manifold 111 selected from among the plurality of first manifolds 111 to prevent corrosion.

In addition, the second separator 200 is also formed in a plate shape and bonded to the first separator 100, and forms a plurality of second manifolds 211 that communicates with the plurality of first manifolds 111 to allow reaction gas or cooling water to flow in or out. A second molding gasket 220 is formed to surround the inner edge of at least one second manifold 211 selected from among the plurality of second manifolds 211 to prevent corrosion.

In this case, the configuration of the first separator 100 and the second separator 200, in particular, the first molding gasket 120 and the second molding gasket 220 employ the same configuration of the separator body and the configuration of the molding gasket as described above.

For example, the second separator is configured to include a second separator body and a second molding gasket, similar to the first separator.

In addition, second reaction regions 210*a*, 210*b* through which reaction gas or cooling water flows are formed in the central region of the second separator body, and the plurality of second manifolds 211 is formed on both sides of the second reaction regions 210*a*, 210*b*.

In this case, the second separator body 210 also has one surface as a second reaction surface 200*a* through which reaction gas flows, and the other surface as a second cooling surface 200*b* through which cooling water flows.

In addition, a second sealing gasket line 213 surrounding the first reaction region 110*a* and each first manifold 111 is formed on the surface of the second separator body 210. In this case, the second sealing gasket line 213 is formed through a gasket injection of a rubber material. However, as shown in FIG. 5B, the second sealing gasket line 213 may not be formed on the cooling surface of the second separator body.

In addition, a plurality of second flow field holes 212 through which reaction gas or cooling water flows is formed in the second separator body 210, like the first separator body, and a second support gasket 214 extending from the second sealing gasket line 213 is formed between the plurality of second flow field holes 212.

However, when among the first manifolds 111 formed on the first separator 100 and the second manifolds 211 formed on the second separator 200, the size and form of the first manifold 111 and the second manifold 211 communicating with each other are the same, the inner edge of the first manifold 111 and the inner edge of the second manifold 211 are disposed on the same line. Then, since the positions where the first molding gasket 120 and the second molding gasket 220 are formed are also arranged on the same line, the flow path through which reaction gas or cooling water flows may be narrowed or blocked depending on the thickness of the first molding gasket 120 and the second molding gasket 220.

In order to prevent such a problem from occurring, in the present embodiment, among the first manifolds 111 formed on the first separator 100 and the second manifolds 211 formed on the second separator 200 constituting the separator assembly, the sizes of the first manifold 111 and the second manifold 211 communicating with each other are formed to be different from each other.

Preferably, as shown in FIG. 6, the inner edge of the first manifold 111 toward the first reaction region 110*a* in the first separator 100 and the inner edge of the second manifold 211 toward the second reaction region 210*a* in the second separator 200 are formed on different lines. In other words, the inner edge of the first manifold 111 and the inner edge of the second manifold 211 formed on the path through which reaction gas or cooling water is introduced or discharged are formed on different lines.

Therefore, as shown in FIGS. 7A and 7B, the positions at which the first molding gasket 120 and the second molding gasket 220 are formed are shifted so that a path through which fluid such as reaction gas or cooling water flows is secured between the first molding gasket 120 and the second molding gasket 220.

In addition, the height (h1) at which the first molding gasket 120 protrudes from the surface of the first separator 100 and the height (h1) at which the second molding gasket 220 protrudes from the surface of the second separator 200 may vary within a range lower than the distance (h2) between the first separator 100 and the second separator 200 in terms of securing a path through which fluid such as reaction gas or cooling water flows. In particular, the height (h1) at which the first molding gasket 120 protrudes from the surface of the first separator 100 and the height (h1) at which the second molding gasket 220 protrudes from the surface of the second separator 200 may be formed at the same height as each other, but the present invention is not limited thereto. In order to guide a path through which fluid such as reaction gas or cooling water flows to a desired path, the height (h1) at which the first molding gasket 120 protrudes from the surface of the first separator 100 and the height (h1) at which the second molding gasket 220 protrudes from the surface of the second separator 200 may be formed to be different from each other.

In particular, the first molding gasket 120 and the second molding gasket 220 may be formed of a thin film in terms of securing a path through which fluid such as reaction gas or cooling water flows.

Therefore, as shown in FIG. 7A, when looking at the cross section of the region where the second flow field hole 212 is not formed, a seal is maintained by the sealing gasket line between the cooling surface 110*b* of the first separator and the cooling surface 210*b* of the second separator.

Then, when looking at the cross section of the region in which the second flow field hole 212 is formed as shown in FIG. 7B, hydrogen as reaction gas flowing through the first manifold 111 and the second manifold 211 is introduced to the first cooling surface 100b of the first separator 100 and the second cooling surface 200b of the second separator 200 through the space between the first molding gasket 120 and the second molding gasket 220, and then passes through the second flow field hole 212 and smoothly flows to the second reaction surface 200a of the second separator 200.

By forming the sizes of the first manifold 111 and the second manifold 211 to be different in this way, the first molding gasket 120 and the second molding gasket 220 are formed at positions displaced from each other. Therefore, a path through which reaction gas or cooling water flows is sufficiently secured between the first molding gasket 120 and the second molding gasket 220 to prevent the interference with the flow of reaction gas or cooling water due to the formation of the first molding gasket 120 and the second molding gasket 220.

Although the present invention has been described with reference to the accompanying drawings and the above-described preferred embodiments, the present invention is not limited thereto, and is defined by the claims described below. Accordingly, those of ordinary skill in the art can variously change and modify the present invention within the scope without departing from the spirit of the claims to be described later.

What is claimed is:

1. A separator for a fuel cell, the separator comprising:
a separator body having a plate shape and comprising a metal material on which a plurality of manifolds is provided to introduce or discharge reaction gas or cooling water; and
a molding gasket surrounding an inner edge of a manifold selected from among the plurality of manifolds provided on the separator body, the molding gasket being configured to prevent corrosion, wherein the molding gasket integrally surrounds upper, side, and bottom surfaces of the inner edge of the selected manifold and wherein the molding gasket surrounds all of the inner edges of the selected manifold to define a closed loop.

2. The separator according to claim 1, wherein:
a reaction region in which a flow field through which the reaction gas or the cooling water flows is provided in a central region of the separator body;
the plurality of manifolds is provided on both sides of the reaction region;
a sealing gasket line surrounding the reaction region and each manifold is provided on a surface of the separator body; and
a height at which the molding gasket protrudes from the surface of the separator body is lower than a height of the sealing gasket line.

3. The separator according to claim 2, wherein:
a plurality of flow field holes is provided between at least one manifold selected from among the plurality of manifolds provided in the separator body and the reaction region and spaced apart at a predetermined interval to flow the reaction gas or the cooling water;
a support gasket extending from the sealing gasket line in a direction of the selected manifold is provided between the plurality of flow field holes; and
the molding gasket is connected to the support gasket.

4. The separator according to claim 3, wherein a height at which the molding gasket protrudes from the surface of the separator body is lower than a height of the support gasket.

5. The separator according to claim 1, wherein a corner of the molding gasket has an inclined surface.

6. A separator assembly for a fuel cell, the separator assembly comprising:
a first separator having a plate shape, the first separator comprising:
a plurality of first manifolds through which reaction gas or cooling water is introduced or discharged; and
a first molding gasket surrounding an inner edge of at least one first manifold selected from among the plurality of first manifolds, the first molding gasket being configured to prevent corrosion, wherein the first molding gasket integrally surrounds upper, side, and bottom surfaces of the inner edge of the at least one first manifold selected from among the plurality of first manifolds and wherein the first molding gasket surrounds all of the inner edges of the selected manifold to define a closed loop; and
a second separator having the plate shape and bonded to the first separator, the second separator comprising:
a plurality of second manifolds in communication with the plurality of first manifolds through which the reaction gas or the cooling water is introduced or discharged; and
a second molding gasket surrounding an inner edge of at least one second manifold selected from among the plurality of second manifolds, the second molding gasket being configured to prevent corrosion.

7. The separator assembly according to claim 6, wherein among the first manifolds of the first separator and the second manifolds of the second separator, the first manifold and the second manifold communicating with each other have different sizes.

8. The separator assembly according to claim 7, wherein:
a first reaction region in which a flow field through which the reaction gas or the cooling water flows is provided in a central region of the first separator;
the plurality of first manifolds is provided on both sides of the first reaction region;
the second separator has a second reaction region provided at a position corresponding to a position where the first reaction region is provided; and
the inner edge of the first manifold facing the first reaction region and the inner edge of the second manifold facing the second reaction region are provided on different lines.

9. The separator assembly according to claim 6, wherein each of a height at which the first molding gasket protrudes from a surface of the first separator and a height at which the second molding gasket protrudes from a surface of the second separator is lower than a distance between the first separator and the second separator.

10. The separator assembly according to claim 9, wherein the height at which the first molding gasket protrudes from the surface of the first separator is different from the height at which the second molding gasket protrudes from the surface of the second separator.

11. The separator assembly according to claim 6, wherein corners of the first molding gasket and the second molding gasket have an inclined surface or a round surface.

12. A fuel cell stack comprising:
a plurality of unit cells provided in a stack, each unit cell comprising a membrane electrode assembly, a pair of gas diffusion layers, a first separator, and a second separator;
wherein the first separator and the second separator facing each other in adjacent unit cells are bonded to each other and integrated;

wherein the first separator has a plate shape and comprises:

a plurality of first manifolds through which reaction gas or cooling water is introduced or discharged; and a first molding gasket surrounding an inner edge of at least one first manifold selected from among the plurality of first manifolds, the first molding gasket being configured to prevent corrosion, wherein the first molding gasket integrally surrounds upper, side, and bottom surfaces of the inner edge of the at least one first manifold selected from among the plurality of first manifolds and wherein the first molding gasket surrounds all of the inner edges of the selected manifold to define a closed loop; and wherein the second separator has the plate shape and is bonded to the first separator, the second separator comprising:

a plurality of second manifolds in communication with the plurality of first manifolds through which the reaction gas or the cooling water is introduced or discharged; and a second molding gasket surrounding an inner edge of at least one second manifold selected from among the plurality of second manifolds.

13. The fuel cell stack according to claim 12, wherein among the first manifolds of the first separator and the second manifolds of the second separator, the first manifold and the second manifold communicating with each other have different sizes.

14. The fuel cell stack according to claim 13, wherein the inner edge of the first manifold and the inner edge of the second manifold are provided on a path through which the reaction gas or the cooling water is introduced or discharged and are provided on different lines from each other.

15. The fuel cell stack according to claim 12, wherein the second molding gasket integrally surrounds upper, side, and bottom surfaces of the inner edge of the at least one second manifold selected from among the plurality of second manifolds.

16. The separator assembly according to claim 6, wherein the second molding gasket integrally surrounds upper, side, and bottom surfaces of the inner edge of the at least one second manifold selected from among the plurality of second manifolds.

17. The separator according to claim 1, wherein the molding gasket integrally surrounds upper, side, and bottom surfaces of the inner edges of each of a selected plurality of the manifolds.

18. The separator according to claim 1, wherein a corner of the molding gasket has a round surface.

* * * * *